May 24, 1966   R. J. HOLTON ETAL   3,252,190
FASTENER DEVICE
Filed Feb. 20, 1964

*INVENTORS*
ROBERT J. HOLTON
BY BENEDICT J. DI BELLO

Teare, Fetzer & Teare
ATTORNEYS

United States Patent Office 3,252,190
Patented May 24, 1966

3,252,190
FASTENER DEVICE
Robert J. Holton, Cleveland, and Benedict J. Di Bello, Brookpark, Ohio, assignors to Tinnerman Products, Inc., Cleveland, Ohio, a corporation of Ohio
Filed Feb. 20, 1964, Ser. No. 346,259
9 Claims. (Cl. 24—73)

This invention relates to a fastening means and more particularly to a fastening device for securing structural components together and/or for securing structural components to an apertured support member, such as a panel or the like.

The fastener device of the present invention is adapted to be used in lieu of complementary attachment means, such as nuts, bolts, screws or the like, for securing two or more apertured or slotted work panels together and which will automatically secure other structural components such as tubing, wiring, shafting, cable, rod and the like, to one another, or to one or more apertured work panels.

Accordingly, an object of the present invention is to provide a light weight, comparatively small, inexpensive fastening device which may be easily applied to an apertured or slotted work panel for securing one or more panels together.

Another object of the present invention is to provide a fastener of the character described which may be easily applied to apertured or slotted work members for firmly securing the members together, without the aid of complementary attachment means, such as nuts, bolts, screws or the like.

A further object of the present invention is to provide a fastener of the character described which may be easily inserted through aligned apertures or slots in two or more superimposed members, such as work panels, and which automatically interlocks the members together in abutting relationship upon deformation of the fastener.

A still further object of the present invention is to provide a substantially flat, co-planar, malleable-like fastener adapted to secure one or more apertured or slotted structural members, such as work panels, together upon deformation of the fastener, and wherein the fastener comprises a loop-like body adapted to be disposed through aligned apertures in the panels, and which loop-like body is adapted to receive therethrough other structural components, such as tubing, wiring, shafting, cable, rod or the like, and wherein deformation of the fastener causes the loop-like body to grippingly engage the structural components and to automatically secure the structural components to the apertured or slotted work panels.

Still another object of the present invention is to provide a fastener of the character described which may be efficiently and economically produced by a single stamping or blanking operation.

Other objects and advantages of the invention will be apparent from the following description taken in conjunction with the accompanying drawings, wherein.

Figure 6:
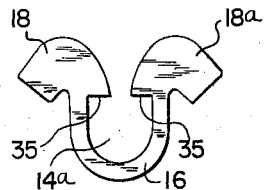
FIG. 6 is a side elevational view of a further modified form of a fastener constructed in accordance with the present invention.
Figure 8:
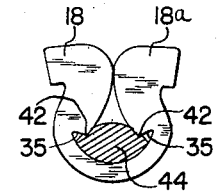
Figure 9:
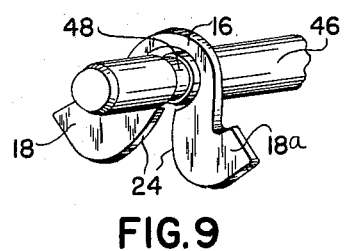
Figure 10:
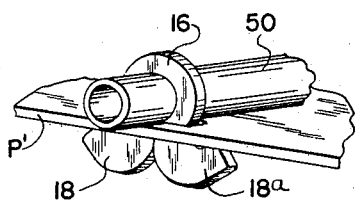

FIG. 8 is a side elevational view of the fastener of FIG. 6, showing still another application of the fastener in mounted and deformed condition grippingly engaging a rod-like member; and FIGS. 9 and 10 are perspective views showing still further applications of the fastener constructed in accordance with the present invention for engageably retaining shafting, tubing and other such structural members.

Figure 2:
FIG. 2 is a top plan view of the fastener of FIG. 1.
Figure 1:
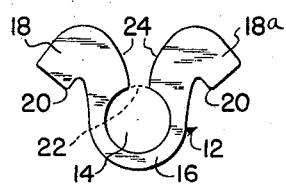
FIG. 1 is a side elevational view of the fastener constructed in accordance with the present invention.
Figure 3:
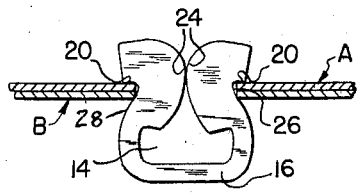
FIG. 3 is a side elevational view, partially sectioned, of the fastener of FIGS. 1 and 2, showing the fastener in mounted, deformed condition on a pair of apertured support panels, and securing the panels together.

Referring now more particularly to the drawings wherein like parts are designated by like reference numerals throughout the various figures, the fastener, designated generally at 10, embodying one form of the present invention is shown in FIGS. 1 to 3 of the drawings. The fastener 10 is preferably formed from a single, substantially flat, sheet of deformable malleable-like metal material, such as cold rolled sheet steel. Such malleable-like material possesses the necessary mechanical characteristics for permanent deformation of the fastener upon application of a predetermined force, as opposed to the resilient character of conventional spring-like materials.

The fastener 10 may be formed open from an elongated sheet of malleable-like metal, and subsequently bent into the configuration shown in FIG. 1, or the fastener may be formed by a single blanking or stamping operation. The latter method being preferred due to the material saving and facility of such method in the manufacture of the fastener. The fastener is shown comprising a generally vertically oriented, loop-like body 12 defined by an interiorly cut-out portion 14 of a generally circular configuration, which in combination provide a generally semi-circular bight portion 16. The upper proximal ends of the bight portion 16 provide an interconnection for integral laterally spaced tabs 18 and 18a which diverge outwardly with respect to one another and with respect to the loop-like body 12 of the fastener. The oppositely disposed fastener tabs 18 and 18a are preferably provided with downwardly and outwardly extending wing portions 20 spaced from the loop-like body 12 and adapted to grippingly engage the surface of the uppermost A of the superimposed panels A and B, as shown at FIG. 3. Accordingly, it is apparent that the loop-like body 12, projecting tabs 18, 18a and retainer wing portions 20 being formed from a single, substantially flat sheet of malleable-like material are disposed in substantially co-planar relationship with respect to one another throughout the length of the fastener, as shown at FIGS. 1 and 2.

As shown in FIG. 1, and prior to application of the fastener, the confronting inner marginal edges of the tabs 18, 18a are spaced apart, as at 22, and define fulcrum surfaces 24 which curve gradually upwardly and outwardly from one another, in a general direction away from the loop-like body 12 of the fastener, and which are adapted for camming engagement against one another, upon application of a predetermined force moving the tabs toward one another. It can be seen that the bight portion 16 defined by the loop-like body 12 is of a materially lesser width as compared to that of the tabs 18, 18a and wing portions 20 to facilitate spreading deformation of the loop-like body upon actuation of the tabs toward one another.

In application of the fastener, the loop-like body 12 may be disposed through aligned openings, such as apertures or slots 26, formed in the panels A and B of FIG. 3. The openings through which the fastener extends may be of any desired configuration, such as circular, which is generally the most economical to produce, or the opening may be of an elongated slotted construction. Such slotted construction is generally preferred since the walls defining the slot proper afford added support to the fastener upon deformation of the fastener into its fastening position. The laterally projecting wing portions 20, upon engagement with the surface of the uppermost panel A, arrest further axial movement of the looped-like body 12 through the aligned openings. Pressure may then be applied to the tabs 18, 18a by means of a suitable tool, such as a pair of pliers, causing the confronting fulcrum surfaces 24 to cam inwardly against one another and further causing pivoting movement of the tabs about the engaged fulcrum surfaces 24. The generally inward pivoting movement of the tabs 18, 18a causes upward movement of the loop-like body 12 and simultaneous deformation of the thinned bight 16, so that the upper marginal edges 28 of the loop-like body (FIG. 3) are cammed against the defining boundary of the opening in the underside of the lower panel B. Continued application of pressure to the tabs 18, 18a firmly urges the panels A and B into tight fitting abutting engagement against one another due to the gripping action of the wings 20 and the pincer-like upward movement of the bight portion of the fastener. In the installed position, the deformed loop-like body 12 effectively spans the opening in the underside of the panel B in the manner of a bridging action to prevent any inadvertent lateral shifting movement of the fastener out of its installed position, until the tabs are spread apart by means of the tool to release the gripping action of the fastener on the panels.

Figure 4:
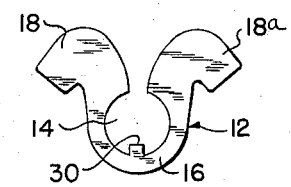
FIG. 4 is a side elevational view of a modified form of the fastener, as compared to that of FIGS. 1 to 3.
Figure 5:
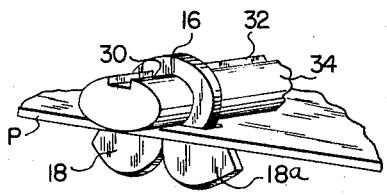
FIG. 5 is a perspective view showing the modified form of the fastener of FIG. 4 mounted in secured relation on an apertured work panel for securing a tube-like member to said panel.

The fastener illustrated in FIGS. 4 and 5 is of the same general type as that illustrated in FIGS. 1 to 3, inclusive, except that the thinned bight 16 of the loop-like body 12 is provided with a centrally disposed, upwardly extending detent or tongue 30 having a generally rectilinear configuration. Such upstanding tongue 30 is adapted to be received in a confronting opening or channel-like slot 32 provided in a structural component 34, such as a tube, shaft, rod, wire or the like, for fastening the component to a support panel P. Moreover, the fastener of FIGS. 4 and 5, and particularly the loop-like body 12, is spreadingly deformed in substantially the same manner, as aforedescribed, with the exception that the structural component 34 is disposed transversely through the loop-like body so that upon application of pressure to the tabs 18, 18a the bight portion 16 is drawn against the component causing the tongue 30 to be engaged firmly within the channel-like slot 32. Such fastener construction effectively prevents rotational movement of the component in its fastened position on the support panel P.

Figure 7:
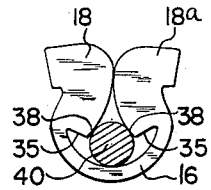
FIG. 7 is a side elevational view of the fastener of FIG. 6, showing the fastener in mounted and deformed condition grippingly engaging a rod-like member.

FIGS. 6 to 8 illustrate another embodiment of the fastener which is generally similar to that of FIGS. 1 to 3, except that the loop-like body 12 is defined by an interiorly cutout portion 14a of generally U-shaped configuration having generally planar, oppositely disposed shoulder portions 35 adapted for engaging a structural component inserted therethrough. As shown in FIG. 7, the shoulder portions 35 are rounded, as at 38, so that upon movement of the tabs 18, 18a toward one another, the thinned bight portion 16 is drawn against the component 40, such as a tube, wire, rod, shaft or the like, causing the rounded shoulders 35 to cam over the upper surface of the component and into generally circumferential fastening engagement therewith. As illustrated in FIG. 8, the shoulder portions 35 are provided with sharp, piercing edges 42 so that upon actuation of the tabs 18, 18a, the edges are caused to penetrate or dig into the component 44 inserted through the fastener. In this form, the component 44 is illustrated as being of a generally ovate configuration so that, upon actuation of the tabs, the loop-like body 12 is deformed and caused to assume substantially the same contour as that of the component to provide an effective interlocking throughout a substantial portion of the peripheral surface of the component.

FIGS. 9 and 10 illustrate further typical applications of the fastener illustrated in FIGS. 1 to 3. In FIG. 9, the fastener is applied for the purpose of retaining a shaft, and in particular for retaining the shaft against axial movement. In such shaft retaining application, the tubular shaft 46 may be provided with an annular groove 48 adapted to engageably receive therein the thinned bight portion 16 when the shaft is inserted through the loop-like body of the fastener. In FIG. 10, the fastener is illustrated as applied for use in fastening a structural component 50, such as the tube, rod, or the like, to a supporting panel P', and is shown absent the upwardly projecting tongue 30 construction of FIGS. 4 and 5.

From the above description and accompanying drawings, it is seen that the present invention has provided a novel one-piece fastener made from a single, substantially flat, malleable-like sheet material which may be easily applied to apertured or slotted structural components, such as panels, and deformed to secure two or more panels together, and which may also be automatically and simultaneously utilized to secure other structural components, such as tubing, shafting, wiring, rod, or the like, together or to the panels. It can be seen that the fastener of the present invention can be applied for securing panels of various thicknesses and of varied apertured or slotted configurations and that such construction effectively eliminates the requirement of multi-part nut and bolt arrangements to accomplish such securement. The fastener also has the advantage of application without utilization of special tools or auxiliary equipment, and particularly in blind installation areas. However, in installations wherein circular openings are used in the work panel, a tool, such as a pair of pliers having slotted jaws into which the fastener fits, may be employed to prevent inadvertent twisting or slipping of the fastener out of the applying tool.

While particular embodiments of this invention have been described and shown above, it will be understood, of course, that the invention is not to be limited thereto, since many modifications may be made of the fastener, such as in the securement of moldings, trim strips and the like, to a work panel, it is contemplated, therefore, by the appended claims, to cover any such modifications as may fall within the true spirit and scope of this invention.

We claim:

1. A deformable fastener adapted for insertion into an opening through a supporting panel, said fastener being formed from a single piece of substantially flat sheet material which has a malleable character, and comprising a loop-like body providing an arcuate portion extending between spaced ends, said arcuate portion being adapted to be disposed through the opening in said panel, said spaced ends having a pair of aligned tabs spaced from each other, projecting from said ends in a direction opposite to the direction of said arcuate portion, and lying in the plane of said body, the width from the inside to the outside surfaces of said arcuate portion being materially less than the width of each of said tabs, and confronting fulcrum areas on said tabs for camming engagement against each other upon inward movement of said tabs toward each other to cause spreading and permanent deformation of said arcuate portion toward a more nearly linearly oriented arrangement.

2. A deformable fastener in accordance with claim 1, including tongue means projecting inwardly from said arcuate portion, and being adapted upon deformation of said fastener, for coacting holding engagement with a tube-like member inserted through said loop-like body.

3. A deformable fastener in accordance with claim 1, wherein the interior of said loop is defined in part by notched portions presenting oppositely disposed shoulders and rounded edge portions at said tabs, said rounded edge portions being adapted, upon deformation of said fastener, for slidable engagement on the outer surface of a tube-like member inserted through said loop-like body.

4. A deformable fastener for mounting in an opening in a support member, such as a panel, said fastener being formed from a single piece of substantially flat sheet material which has a malleable character, and comprising a head, a loop-like body providing a generally vertically oriented arcuate portion having spaced ends depending from said head and adapted to be disposed in the opening in said support member, said head having a pair of aligned tabs spaced from one another and integrally connected with the ends of said arcuate portion, said tabs including wing portions adjacent said ends and adapted for engagement with the confronting side of said support member for limiting movement of said arcuate portion through the opening in the mounted portion of the fastener, the width between the inner and outer surfaces of said arcuate portion being materially less than the width of said tabs, said tabs including oppositely curved edges diverging from each other in the plane of said arcuate portion, said edges defining confronting fulcrum areas for camming engagement against each other upon inward movement of said tabs toward one another to cause spreading and permanent deformation of said arcuate portion toward a more nearly linearly oriented arrangement and into abutting engagement against the under side of said support member, and tongue means of generally rectilinear configuration projecting upwardly from and interiorly of said arcuate portion and adapted for coacting holding engagement with a tube-like member inserted through said loop-like body.

5. A deformable fastener in accordance with claim 4, wherein the interior of the loop-like body is defined by a cut-out portion of generally circular configuration.

6. A deformable fastener in accordance with claim 4, wherein said loop-like body is defined by a cut-out portion of generally U-shaped configuration presenting oppositely disposed shoulders and rounded edge portions at said tabs, said rounded edge portions being adapted, upon deformation of said fasteners, for slidable engagement on the outer surface of a tube-like member inserted through said loop-like body.

7. A deformable fastener in accordance with claim 6, wherein said shoulders define sharp piercing edges for gripping penetration on the outer surface of the tube-like member inserted through the loop-like body of the fastener.

8. A deformable fastener adapted for insertion into an opening through a supporting panel, said fastener being formed from a single piece of substantially flat and relatively thick sheet material having a malleable-like but stiff characteristic and comprising a loop-like body adapted to be disposed through the opening in the panel, the interior of said body being defined in part by a pair of notched portions presenting oppositely disposed shoulders and rounded edge portions, said rounded edge portions being adapted, upon deformation of said fastener, for slidable engagement on the outer surface of a tube-like member inserted through said loop-like body, a pair of aligned tabs spaced from each other integral with said rounded edge portion, and lying in the plane of said loop-like body, and confronting fulcrum areas on said tabs for camming engagement against each other upon inward movement of said tabs toward each other to cause spreading and permanent deformation of said loop-like body, said shoulders defining sharp piercing edges for gripping penetration on the outer surface of the tube-like member inserted through the loop-like body of said fastener.

9. A deformable fastener for mounting in an opening in a support member, such as a panel, said fastener being formed from a single piece of substantially flat and relatively thick sheet of malleable metal and comprising a loop-hole body providing a generally vertically oriented arcuate portion having spaced ends, said loop-like portion being adapted to be disposed in the opening in the support member, said spaced ends having a pair of aligned tabs integrally connected with the ends of said arcuate portion, spaced from each other, and extending in a direction opposite to the direction of said arcuate portion, said tabs including wing portions adjacent said ends and adapted for engagement with the confronting side of said supporting member for limiting movement of said arcuate portion through said opening in the mounted position of the fastener, the width between the inner and outer surfaces of said arcuate portion being materially less than the width of said tabs, said tabs including oppositely curved edges diverging from each other in the plane of said arcuate portion, said edges defining confronting fulcrum areas for camming engagement against each other upon inward movement of said tabs toward one another to cause spreading and permanent deformation of said arcuate portion toward a more nearly linearly oriented arrangement and into abutting engagement against the under side of said support member, and tongue means of generally rectilinear configuration projecting upwardly from and interiorly of said arcuate portion and adapted for coacting holding engagement with a tube-like member inserted through said loop-like body.

References Cited by the Examiner

UNITED STATES PATENTS

| | | | |
|---|---|---|---|
| 677,606 | 7/1901 | St. Clair | 248—353 |
| 1,925,488 | 9/1933 | Kern | 256—54 |
| 2,401,976 | 6/1946 | Simpson | 25—83 |
| 2,797,607 | 7/1957 | Blaski | 85—38 |

WILLIAM FELDMAN, *Primary Examiner.*

DONLEY J. STOCKING, *Examiner.*

E. SIMONSEN, *Assistant Examiner.*